(12) United States Patent
Moriai

(10) Patent No.: US 7,394,847 B2
(45) Date of Patent: Jul. 1, 2008

(54) RECEIVING METHOD AND RECEIVER WITH HIGH-PRECISION SIGNAL ESTIMATION

(75) Inventor: Shinsuke Moriai, Inuyama (JP)

(73) Assignee: Sanyo Electric Co., Ltd., Osaka (JP)

( * ) Notice: Subject to any disclaimer, the term of this patent is extended or adjusted under 35 U.S.C. 154(b) by 526 days.

(21) Appl. No.: 11/086,315

(22) Filed: Mar. 23, 2005

(65) Prior Publication Data

US 2005/0213642 A1    Sep. 29, 2005

(30) Foreign Application Priority Data

Mar. 23, 2004    (JP)    ............................. 2004-084575

(51) Int. Cl.
*H04B 1/00*    (2006.01)
(52) U.S. Cl. ..................... 375/150; 375/316; 375/340
(58) Field of Classification Search ................ 375/130, 375/131, 147, 150, 316, 322, 324, 326, 329, 375/332, 340
See application file for complete search history.

(56) References Cited

U.S. PATENT DOCUMENTS 6,487,236 B1 * 11/2002 Iwamatsu et al. ............ 375/148
6,693,954 B1 * 2/2004 King et al. ................... 375/147

FOREIGN PATENT DOCUMENTS

JP    2003-168999    6/2003

* cited by examiner

*Primary Examiner*—Chieh M. Fan
*Assistant Examiner*—Naheed Ejaz
(74) *Attorney, Agent, or Firm*—McDermott Will & Emery LLP

(57) ABSTRACT

A second phase rotation unit rotates a signal equalized by an equalizer by a phase error detected by a second phase error detection unit. A decision unit partitions a phase plane into a plurality of sub-areas in accordance with phases to which CCK modulated signals are assigned. The decision unit identifies a sub-area corresponding to an output signal from the second phase rotation unit, and thereby converts the output signal from the second phase rotation unit into a value corresponding to the identified sub-area. An FWT transform unit subjects the value resulting from conversion in the decision unit to FWT computation so as to output a Walsh transform value FWT. A maximum value searching unit receives 64 Walsh transform values FWT and selects one Walsh transform value by referring to the magnitude thereof.

21 Claims, 10 Drawing Sheets

150

150

RECEIVING METHOD AND RECEIVER WITH HIGH-PRECISION SIGNAL ESTIMATION

BACKGROUND OF THE INVENTION

1. Field of the Invention

The present invention relates to a technology of signal receiving and, more particularly to a method and apparatus for receiving a spread spectrum signal.

2. Description of the Related Art

Wireless local area network (LAN) that complies with the IEEE 802.11b standard is practiced as a spread spectrum communications system using a radio frequency of 2.4 GHz band. The IEEE 802.11b wireless LAN enables a maximum transmission rate of 11 Mbps using complementary code keying (CCK). The Radio Law prescribes the bandwidth of wireless LAN to be 26 MHz. Therefore, the maximum chip rate in a direct sequence scheme is also 26 Mcps. Assuming that the chip rate of 26 Mcps is band-limited by an ideal Nyquist filter, the sampling frequency required of a D/A converter is 40 MHz. Also, strict band limitation after the D/A conversion is necessary. Therefore, band limitation using a Nyquist filter is not practical. Instead of using a Nyquist filter for band limitation, analog filtering subsequent to the D/A conversion is used for band limitation, resulting in a maximum chip rate of 11 Mbps. In a receiver adapted for CCK modulation, a plurality of waveform patterns for a transmitted signal are generally prepared. A signal having a waveform that best matches the waveform of the received signal is defined as a demodulation result (See Reference (1) in the following Related Art List, for instance).

Related Art List (1) Japanese Patent Application Laid-Open No. 2003-168999.

In demodulating a CCK modulated signal, i.e. in demodulating a Walsh-coded signal, a plurality of correlations are determined from a received signal, using fast Walsh transformation (FWT) computation. The largest correlation is identified from a plurality of correlations. A combination of transmitted signals providing the largest correlation is reconstructed. If an error is included, however, in correlations determined as a result of FWT computation due, for example, to noise or multipath transmission, a combination of signals not actually transmitted may be selected. Since a wireless LAN apparatus is desirably small, internal processes should be simplified as much as possible.

SUMMARY OF THE INVENTION

The present invention has been done in view of the aforementioned circumstances and its object is to provide a receiving technology for estimating a transmitted signal with a high precision while reducing the processing volume for estimating a transmitted signal by referring to results of Walsh transform.

The present invention according to one aspect provides a receiver. The receiver according to this aspect comprises: a receiving unit which receives a signal in which a symbol comprises Walsh codes each comprising a plurality of chips and each generated from a plurality of phase signals; a phase correction unit which corrects a phase of the received signal such that the phase approaches one of phases to which Walsh codes are assigned; a signal transform unit which partitions a phase plane in which a phase-corrected signal is assigned into a plurality of sub-areas in accordance with the phases to which the Walsh codes are assigned, identifies one of the sub-areas that corresponds to the phase-corrected signal, and thereby transforms the phase-corrected signal into a value corresponding to the identified sub-area; a Walsh transform unit which subjects the value corresponding to the identified sub-area to Walsh transform symbol by symbol, so as to generate a plurality of correlations; and a selection unit which selects one correlation from the plurality of correlations thus generated and outputs a plurality of phase signals corresponding to the selected correlation. The signal transform unit may define the number of bits in the value corresponding to the identified sub-area to be smaller than the number of bits in the phase-corrected signal.

In the above-described receiver, Walsh transform is performed after converting a pre-FWT signal into a signal including a smaller number of bits. Therefore, the processing volume is reduced. Further, since the absolute phase is corrected such that the received signal is assigned to a predetermined phase. Therefore, even when the number of bits in the processed signal is reduced, degradation in the receiving performance is minimized.

The signal transform unit may define the number of sub-areas to be equal to or larger than the number of phases to which the Walsh codes are assigned, and define the absolute value of the value corresponding to the identified sub-area that includes a phase to which a corresponding one of the Walsh codes is assigned to be relatively large. In the above-described receiver, the value corresponding to the identified sub-area is defined such that, the greater its reliability, the larger its absolute value. Accordingly, the precision in the result of Walsh transform on the value corresponding to the identified sub-area is improved.

The signal transform unit may provide a sub-area to which the phase-corrected signal should belong when a magnitude of the phase-corrected signal is smaller than a predetermined threshold value, and define the absolute value of the value corresponding to the sub-area thus provided is relatively small. In the above-described receiver, the reliability of the phase-corrected signal is determined to be low when the magnitude thereof is small. The absolute value of the value corresponding to the above sub-area is defined to be relatively small. Accordingly, the precision in Walsh transform on the value corresponding to the sub-area is prevented from being dropped.

The Walsh code included in the signal received by the receiving unit may be assigned to a phase at which absolute values of an in-phase component of the Walsh code and a quadrature component of the Walsh code are identical, and the signal transform unit may define the value corresponding to the identified sub-area to comprise the same number of bits in an in-phase component and a quadrature component. The selection unit may comprise: an approximation unit which calculates an approximate value of a magnitude of the plurality of correlations such that the approximate value is larger as the correlation approaches any of the phases to which the Walsh codes are assigned; and an output unit which selects one correlation by referring to the approximate value of the magnitude of the plurality of correlations thus calculated, and outputs a plurality of phase signals corresponding to the selected correlation.

More specifically, the "phase at which absolute values of an in-phase component of the Walsh code and a quadrature component of the Walsh code are identical" are phases $\pi/4$, $3\pi/4$, $5\pi/4$ and $7\pi/4$, given that the in-phase axis is a horizontal axis and the quadrature axis is a vertical axis and 0 is defined on the in-phase axis.

In the above-described apparatus, the phase of the received signal is corrected so that the corrected signal approaches the phase to which the constellation point is assigned. Thereafter, approximation is performed such that, the closer to the phase to which the constellation point is assigned, the larger the magnitude of the approximate value for the corrected signal. The signal with a large approximate value is selected. Therefore, the receiving performance is improved.

The present invention according to another aspect provides a receiving method. The receiving method according to this aspect comprises the steps of: receiving a signal in which a symbol comprises Walsh codes each comprising a plurality of chips and each generated from a plurality of phase signals; correcting a phase of the received signal such that the phase approaches one of phases to which Walsh codes are assigned; partitioning a phase plane in which a phase-corrected signal is assigned into a plurality of sub-areas in accordance with the phases to which the Walsh codes are assigned, identifying one of the sub-areas that corresponds to the phase-corrected signal, and thereby transforming the phase-corrected signal into a value corresponding to the identified sub-area; subjecting the value corresponding to the identified sub-area to Walsh transform symbol by symbol, so as to generate a plurality of correlations; and selecting one correlation from the plurality of correlations thus generated and outputting a plurality of phase signals corresponding to the selected correlation. The step of transforming may define the number of bits corresponding to the identified sub-area to be smaller than the number of bits in the phase-corrected signal.

The transforming step may define the number of sub-areas to be equal to or larger than the number of phases to which the Walsh codes are assigned, and define the absolute value of the value corresponding to the identified sub-area that includes a phase to which a corresponding one of the Walsh codes is assigned to be relatively large. The transforming step may provide a sub-area to which the phase-corrected signal should belong when a magnitude of the phase-corrected signal is smaller than a predetermined threshold value, and define the absolute value of the value corresponding to the sub-area thus provided is relatively small. The Walsh code included in the signal received by the receiving step may be assigned to a phase at which absolute values of an in-phase component of the Walsh code and a quadrature component of the Walsh code are identical, and the transforming step may define the value corresponding to the identified sub-area to comprise the same number of bits in an in-phase component and a quadrature component. The selecting step may comprise the steps of: calculating an approximate value of a magnitude of the plurality of correlations such that the approximate value is larger as the correlation approaches any of the phases to which the Walsh codes are assigned; and selecting one correlation by referring to the approximate value of the magnitude of the plurality of correlations thus calculated, and outputting a plurality of phase signals corresponding to the selected correlation.

Arbitrary combinations of the aforementioned constituting elements, and implementations of the invention in the form of methods, apparatuses, systems, recording mediums and computer programs may also be practiced as additional modes of the present invention.

Moreover, this summary of the invention does not necessarily describe all necessary features so that the invention may also be sub-combination of these described features.

DETAILED DESCRIPTION OF THE INVENTION

Figure 1:
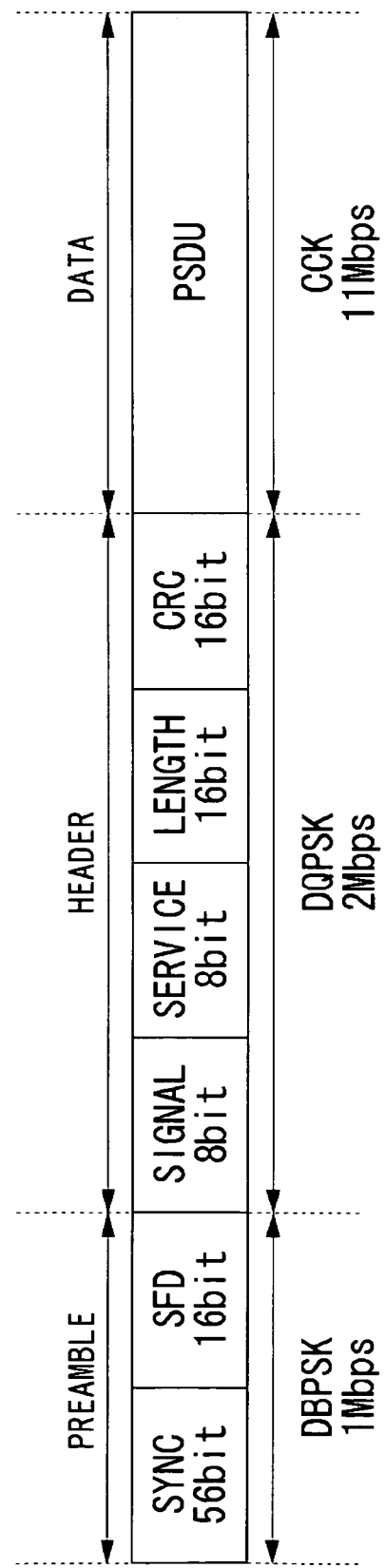
FIG. 1 illustrates the burst format of a communications system according to an example of the present invention.

The invention will now be described based on the following embodiments which do not intend to limit the scope of the present invention but exemplify the invention. All of the features and the combinations thereof described in the embodiments are not necessarily essential to the invention.

Before giving a specific description of the present invention, a summary of will be given. An example of the present invention relates to a wireless LAN receiver that complies with the IEEE 802.11b standard. The receiver subjects a CCK modulated signal included in a received signal to FWT computation. The receiver further selects the largest correlation from a plurality of correlations obtained as a result of FWT computation and reconstructs a combination of phase signals corresponding to the largest correlation thus selected. A correlation is a complex number having an in-phase component and a quadrature component. Normally, for determination of the magnitude of correlation, a square sum is calculated so that the volume of computation is relatively large. In CCK modulation, a chip signal is generated based on differentially encoded signals so that, normally, a receiver does not require correction of absolute phase.

The receiver according to the example corrects the absolute phase of the received signal. Further, each of the in-phase component and the quadrature component of the phase-corrected signal is converted into a predetermined number of bits by referring to a predetermined threshold value. The resultant values are subject to FWT computation so as to generate a plurality of correlations. With this, the processing volume for FWT computation can be reduced. The receiver according to the example performs approximation of the magnitude of correlation such that the correlation is larger as the correlation is removed from an in-phase axis and a quadrature axis. The correlation to be finally selected tends to be assigned to a phase that provides an approximate value larger than without the aforementioned rule. As a result, the correlation to be finally selected is assigned to a phase that provides a relatively large approximate value. This results in the likelihood of the largest correlation being selected from a plurality of correlations becoming large so that the signal receiving performance is improved.

As an introduction to the first example of the invention, a brief description will be given of CCK modulation in the IEEE802.11b standard. In CCK modulation, 8 bits are grouped into one unit (hereinafter, this unit will be referred to as a CCK modulation unit). The 8 bits will be referred to as d1, d2, ... d8 in the descending order of digits. The lower 6 bits in the CCK modulation unit, i.e., pairs [d3, d4], [d5, d6], [d7, d8] are mapped into the quadrature phase shift keying (QPSK) constellation points, respectively. The mapped phases will be denoted by ($\phi$2, $\phi$3, $\phi$4), respectively. 8 spreading codes P1 through P8 are generated from the phases $\phi$2, $\phi$3, $\phi$4, as given below.

$$P1=\phi 2+\phi 3+\phi 4$$

$$P2=\phi 3+\phi 4$$

$$P3=\phi 2+\phi 4$$

$$P4=\phi 4$$

$$P5=\phi 2+\phi 3$$

$$P6=\phi 3$$

$$P7=\phi 2$$

$$P8=0 \qquad (1)$$

The higher two bits [d1, d2] of the CCK modulation unit are mapped into a constellation point of the differential encoding quadrature shift keying (DQPSK). The mapped phase will be denoted by $\phi$1. $\phi$1 corresponds to a spread signal. 8 chip signals X0 through X7 are generated from the spread signal $\phi$1 and the spreading codes P1 through P8, as given below.

$$X0=e^{j(\phi 1+P1)}$$

$$X1=e^{j(\phi 1+P2)}$$

$$X2=e^{j(\phi 1+P3)}$$

$$X3=-e^{j(\phi 1+P4)}$$

$$X4=e^{j(\phi 1+P5)}$$

$$X5=e^{j(\phi 1+P6)}$$

$$X6=-e^{j(\phi 1+P7)}$$

$$X7=e^{j(\phi 1+P8)} \qquad (2)$$

A transmitter transmits the chip signals X0 through X7 in the stated order (hereinafter, a time sequence unit comprising the chip signals X0 through X7 will also be referred to as a CCK modulation unit). In the IEEE802.11b standard, in addition to using CCK modulation, DBPSK and DQPSK phase modulated signals are spread by known spreading codes and transmitted.

FIG. 1 shows a burst format in a communications system according to the first example of the present invention. The burst format corresponds to short PLCP of the IEEE802.11b standard. As illustrated, the burst signal includes preamble, header and data fields. The preamble is transmitted at a transmission rate of 1 Mbps according to the DBPSK modulation scheme. The header is transmitted at a transmission rate of 2 Mbps according to the DQPSK modulation scheme. The data is transmitted at a transmission rate of 11 Mbps according to the CCK modulation scheme. The preamble includes SYNC of 56 bits and SFD of 16 bits. The header includes SIGNAL of 8 bits, SERVICE of 8 bits, LENGTH of 16 bits and CRC of 16 bits. The length of PSDU corresponding to the data is variable. The burst signal subject to the processing according to the present invention is not limited to that of FIG. 1. For simplified explanation, the following description concerns the process on the burst format of FIG. 1.

Figure 2:
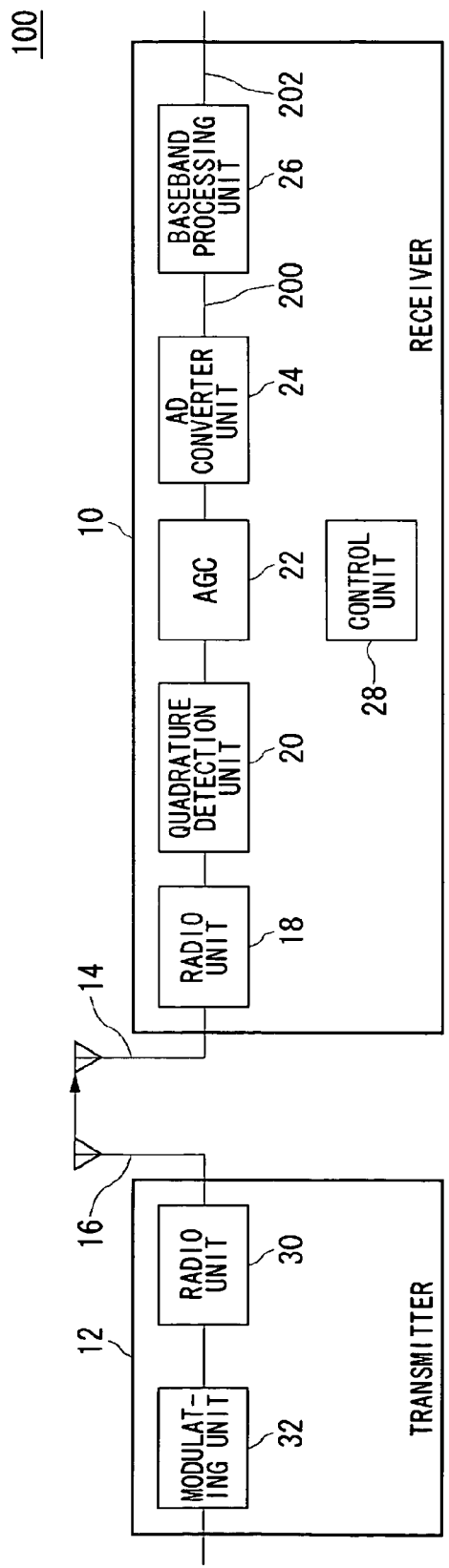
FIG. 2 illustrates the structure of the communications system according to the example.

FIG. 2 shows the structure of a communications system 100 according to the example. The communications system 100 includes a receiver 10 and a transmitter 12. The receiver 10 includes a receiving antenna 14, a radio unit 18, a quadrature detection unit 20, an automatic gain control (AGC) 22, an AD converter unit 24, a base band processing unit 26 and a control unit 28. The transmitter 12 includes a transmission antenna 16, a radio unit 30 and a modulating unit 32. The signals involved include a digital received signal 200 and an output signal 202.

As described before, the modulating unit 32 subjects information to be transmitted in a data segment of the burst format of FIG. 1 to CCK modulation, or subjects a phase modulated signal in a preamble segment or a header segment of the burst format to spreading. The CCK modulated signal is mapped into phases where the absolute values of an in-phase component and a quadrature component of a signal are identical, i.e. the QPSK constellation points. The radio unit 30 converts frequency between a base band signal output from the modulation unit 32 and a radio frequency signal. The radio unit 30 subjects amplification. The transmission antenna 16 transmits the radio frequency signal and the receiving antenna 14 receives the radio frequency signal.

The radio unit 18 subjects the received radio frequency signal to frequency conversion to obtain an intermediate frequency signal. The signal received includes Walsh codes each comprising a plurality of chips and each generated from a plurality of phase signals, i.e. the received signal includes a CCK modulated signal. For simplified explanation, it is assumed that a frequency offset introduced into the received signal is small. The quadrature detection unit 20 subjects the intermediate frequency signal to quadrature detection so as to output a base band signal. Generally, the base band signal is illustrated as comprising an in-phase component and an quadrature component. FIG. 2, however, illustrates the components as being combined. The AGC 22 automatically controls the gain so as to fit the amplitude of the base band signal in a dynamic range of the AD converter unit 24 described later. The AD converter unit 24 converts the analog base band signal into a digital signal so as to output the digital received signal 200 composed of a plurality of bits. The base band processing unit 26 subjects the digital received signal 200 to despreading or demodulation so as to output the output signal 202. The control unit 28 controls the timing to be observed in the receiver 10.

Figure 3:
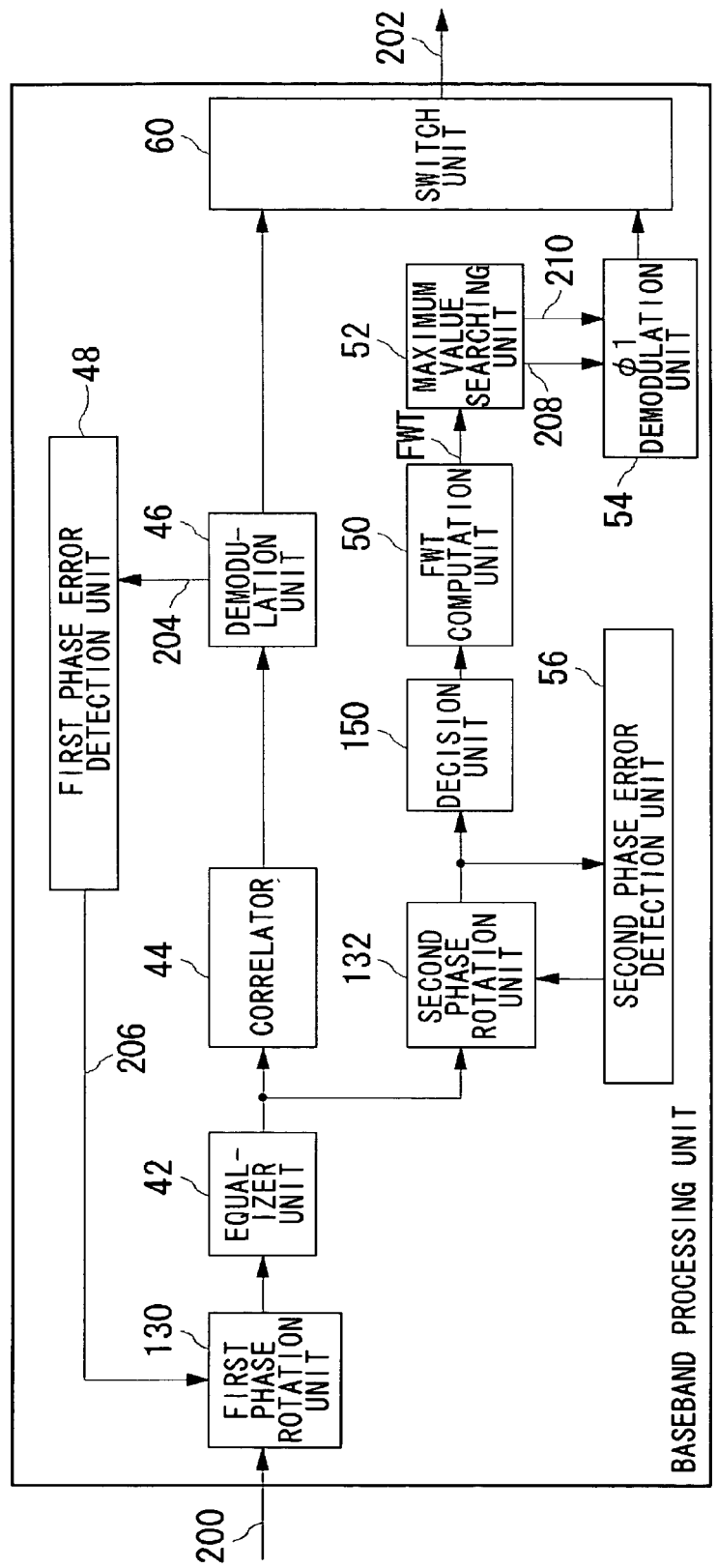
FIG. 3 illustrates the structure of a baseband processing unit of FIG. 2.

FIG. 3 shows the structure of the base band processing unit 26. The base band processing unit 26 comprises a first phase rotation unit 130, an equalizer unit 42, a correlator 44, a demodulation unit 46, a first phase error detection unit 48, a second phase rotation unit 132, a decision unit 150, an FWT computation unit 50, a maximum value searching unit 52, a $\phi$1 demodulation unit 54, a second phase error detection unit 56 and a switch unit 60. The signals involved include a demodulated signal 204, a phase error signal 206, a $\phi$1 signal 208 and a $\phi$ component signal 210 and a Walsh transform value FWT.

The first phase rotation unit 130 rotates the phase of the digital received signal 200 in accordance with the phase error signal 206 output from the first phase error detection unit 48 described later. It is ensured that, as a result of rotation, each of the constellation points of the digital received signal 200 approaches a corresponding one of the phases to which the CCK modulated signals are assigned. In other words, each of the constellation points approaches a corresponding one of the phases intermediate between the in-phase axis and the quadrature axis, i.e., $\pi/4$, $3\pi/4$, $5\pi/4$, $7\pi/4$. The rotation by the first phase rotation unit 130 may be effected by vector computation on components of complex numbers or addition and subtraction in phase components.

The equalizer unit 42 eliminates effects from multipath transmission included in the signal output from the first phase rotation unit 130. The equalizer unit 42 is composed of filters of a transversal type. A DFE may be added to the filters of a transversal type. The equalizer unit 42 may output the input signal intact until tap coefficients of the equalizer unit 42 are set.

The correlator 44 subjects the signal output from the equalizer unit 42 to a correlating process using predetermined spreading codes, so as to despread the phase modulated signals, such as the preamble and the header of the bust format of FIG. 1, spread by the same predetermined spreading codes. The correlation may be a process of a sliding type or a process of a matched filter type. As described, the correlator 44 operates normally on the preamble and the header in the burst format of FIG. 1. When the data is a phase modulated signal spread by a predetermined spreading code, the correlator 44 also operates on the data segment.

The demodulator 46 demodulates the despread signal 204 despread by the correlator 44. The modulation scheme of the despread signal 204 is DBPSK or DQPSK so that demodulation is performed using differential detection. The first phase error detection unit 48 detects a phase error in accordance with the despread signal 204. The detected phase error is output as the phase error signal 206. Details will be described later.

The second phase rotation unit 132 rotates the signal equalized by the equalizer unit 42 by the phase error detected by the second phase error detection unit 56. It is ensured that, as a result of rotation, the equalized signal approaches one of the phases to which the CCK modulated signals are assigned. While the first phase rotation unit 130 performs a similar process, the second phase rotation unit 132 corrects a residual component of phase error that remains after the process by the first phase rotation unit 130. The second phase error detection unit 56 detects the phase error by referring to the output signal from the second phase rotation unit 132. Detection is done by a method similar to that used by the first phase error detection unit 48.

Figure 4:
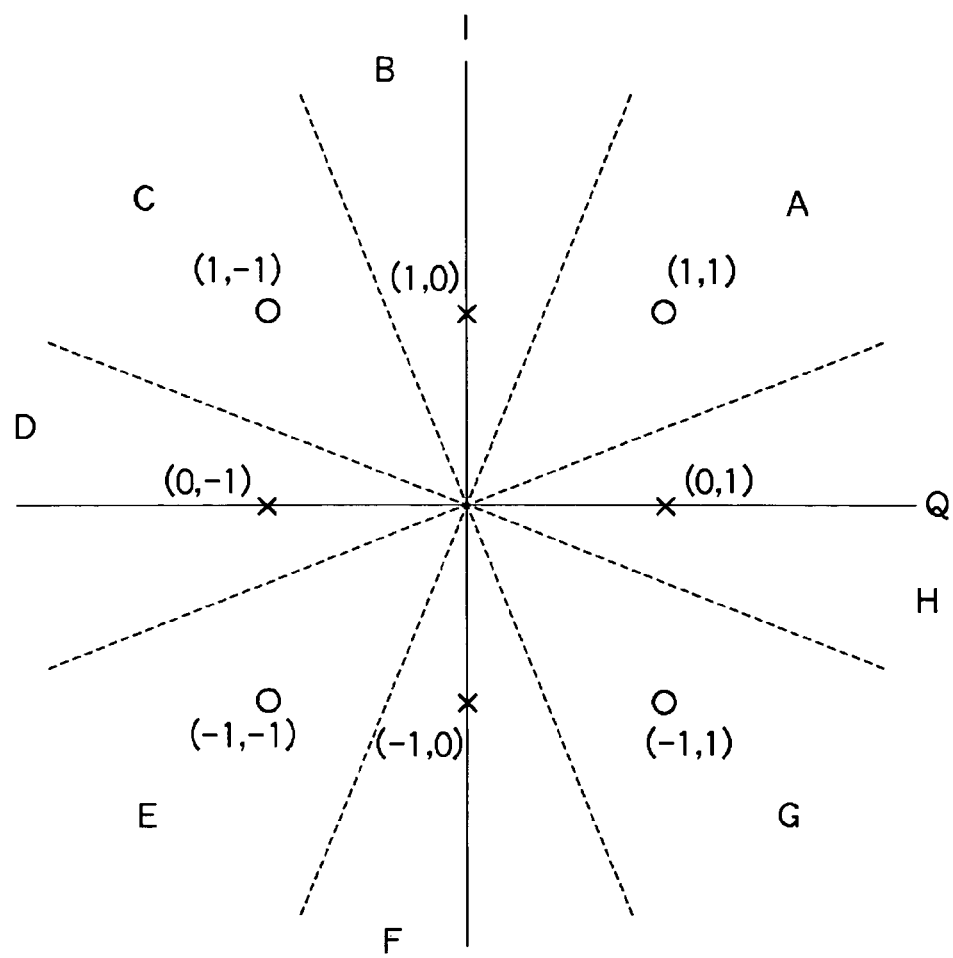
FIG. 4 illustrates a set of constellation points provided in a determination unit of FIG. 3.

The decision unit 150 partitions a phase plane into a plurality of sub-areas in accordance with the phases to which the CCK modulated signals are assigned. By identifying one of the sub-areas corresponding to the output signal from the second phase rotation unit 132, the decision unit 150 converts from the output signal from the second phase rotation unit 132 into a value corresponding to the detected sub-area. FIG. 4 illustrates the constellation points provided in the decision unit 150. As illustrated, the phase plane is provided with an in-phase (I) axis and a quadrature (Q) axis. The decision unit 150 partitions the phase plane into 8 sub-areas, which is in excess of 4, the number of phases to which the CCK modulated signals are assigned. The 8 sub-areas are areas "A" from "H" of equal size resulting from partitioning of the entire 360° phase around an origin where both I and Q values are 0.

Each of the sub-areas "A", "C", "E" and "G" includes a constellation point to which a CCK modulated signal is assigned. These points are marked by circles in the figure. The other individual areas "B", "D", "F" and "H" do not include a constellation point to which a CCK modulated signal is assigned. Instead, representative constellation points (hereinafter, referred to as representative points) respectively representing these sub-areas are provided. The constellation points to which the CCK modulate signals are assigned and the representative points are generically referred to as constellation points corresponding to the sub-areas and marked by crosses in the figure. The constellation points to which the CCK modulate signals are assigned are located at coordinates (1,1), (1,−1), (−1,−1) and (−1,1). The representative points are located at coordinates (1,0), (0,−1), (−1,0) and (0,1).

Representing these coordinates in binary numbers, "1" corresponds to "01", "0" corresponds to "00" and "−1" corresponds to "10". Therefore, the constellation points corresponding to the sub-areas are defined by values comprising the same number of bits in the in-phase component and the quadrature component. More specifically, the constellation points corresponding to the sub-areas are defined by 2-bit values. Further, the constellation points corresponding to the sub-areas are defined such that the absolute values thereof are larger those of the representative points. The decision unit 150 maps the constellation point of the output signal from the second phase rotation unit 132 into one of the sub-areas "A" through "H" and outputs a value indicating the constellation point corresponding to the sub-area thus identified. For example, when the area "A" is identified, the decision unit 150 outputs (1,1). Each of the in-phase component and the quadrature component included in the output signal from the second phase rotation unit 132 comprises a predetermined number of bits. In contrast, each of the in-phase component and the quadrature component included in each of the constellation points corresponding to the individual areas comprises 2 bits, smaller than the aforementioned number of bits. Accordingly, the number of signal bits can be reduced.

Figure 5:
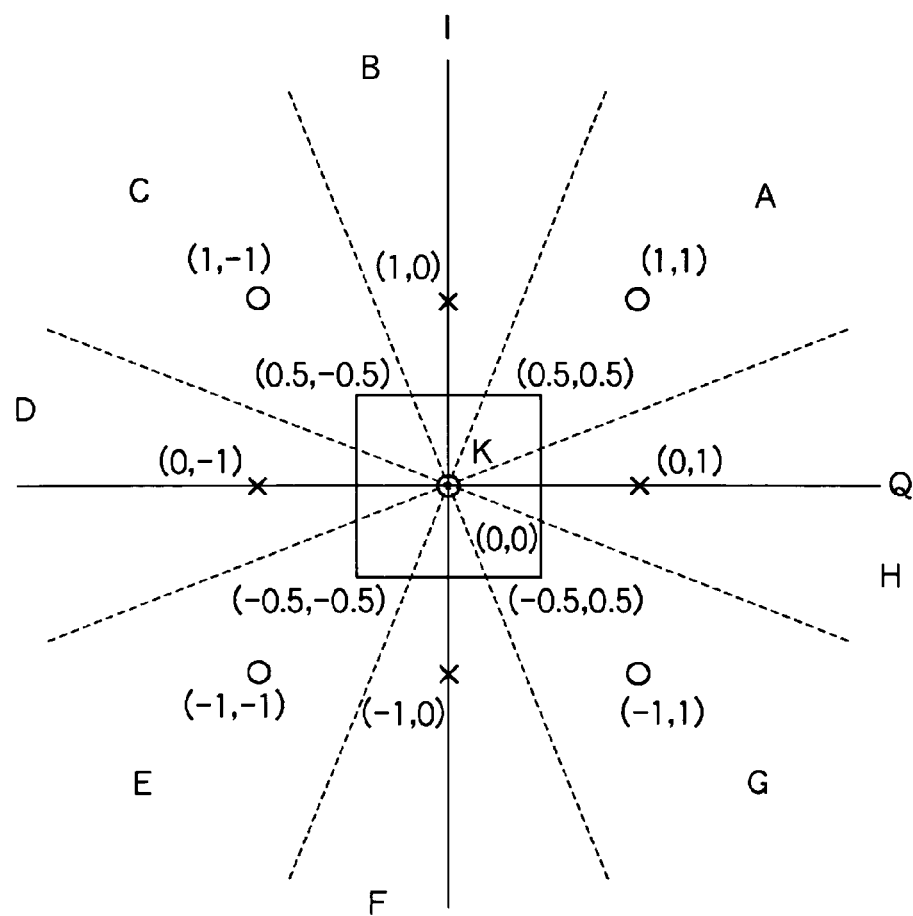
FIG. 5 illustrates another set of constellation points provided in the determination unit of FIG. 3.

FIG. 5 illustrates another constellation point provided in the decision unit 150. A threshold value is provided at coordinates "0.5" and "−0.5" of each of the I axis and the Q axis. There is provided a sub-area "K" where the output signal from the second phase rotation unit 132 should belong, when the absolute values of the in-phase component and the quadrature component thereof are both smaller than the absolute value of the threshold value. A representative point is provided in the sub-area "K" at a coordinate "0,0". The decision unit 150 maps the constellation point of the output signal from the second phase rotation unit 132 into one of the sub-areas "A" through "H" and "K" and outputs a value corresponding to the area thus identified. For example, the decision unit 150 outputs (0,0) when the identified sub-area is "K". Accordingly, when the output signal from the second phase rotation unit 132 is relatively small in magnitude, the output signal from the second phase rotation unit 132 is mapped into an area not related to the phase of the output signal.

Referring back to FIG. 3, the FWT computation unit 50 subjects to FWT computation a value which corresponds to the CCK modulated signal such as the data segment of the burst format of FIG. 1 and which results from conversion in the decision unit 150. The FWT computation unit 50 outputs a resultant Walsh transform value FWT. More specifically, the FWT computation unit 50 receives the chip signals, i.e. a CCK modulation unit, resulting from conversion in the decision unit 150. The FWT computation unit 50 outputs correlations, i.e. 64 Walsh transform values FWT, by identifying chip to chip correlation.

The maximum value searching unit 52 receives the 64 Walsh transform values FWT and selects a single Walsh transform value FWT, by referring to the magnitude of the values. Further, in accordance with the selected Walsh transform value FWT, the maximum value searching unit 52 outputs the $\phi 1$ signal 208 and the $\phi$ component signal 210. The $\phi 1$ signal 208 corresponds to the signal prior to differential detection and the $\phi$ component signal 210 indicating a combination of $\phi 2$ through $\phi 4$. The $\phi 1$ demodulation unit 54 subjects the $\phi 1$ signal 208 to differential detection so as to generate $\phi 1$. The $\phi 1$ demodulation unit 54 further reconstructs information bits d1, d2 . . . d8 that are target for transmission from the combination of φ1 through φ4.

The switch unit 60 selects either the signal output from the demodulation unit 46 or the signal output from the φ1 demodulation unit 54. The switch unit 60 outputs the selected signal as the output signal 202. In a time interval for the preamble and header fields of FIG. 1, the switch unit 60 selects the signal output from the demodulation unit 46 and selects the signal output from the φ1 demodulation unit 54 in a time interval for the data field of the burst format. In the aforementioned process, the processed signal is converted into a smaller number of bits by the decision unit 150. Therefore, the processing volume is reduced.

The structure as described above may be implemented by hardware including a CPU, a memory and an LSI and by software including a program provided with reservation and management functions loaded into the memory. FIG. 3 depicts function blocks implemented by cooperation of the hardware and software. Therefore, it will be obvious to those skilled in the art that the function blocks may be implemented by a variety of manners including hardware only, software only or a combination of both.

Figure 6:
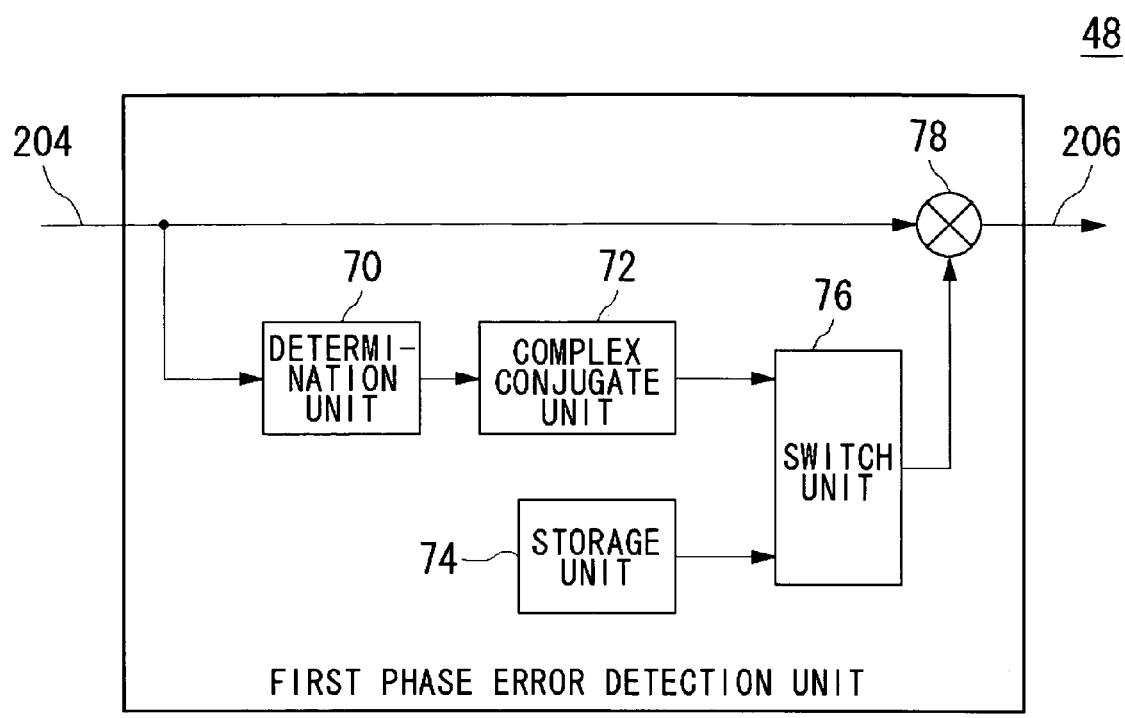
FIG. 6 illustrates the structure of a first phase error detection unit of FIG. 3.

FIG. 6 shows the structure of the first phase error detection unit 48. The first phase error detection unit 48 includes a storage unit 74, a determination unit 70, a complex conjugate unit 72, a switch unit 76 and a multiplication unit 78.

The storage unit 74 stores a known signal corresponding to the preamble field of the burst format of FIG. 1 and outputs the known signal at a point of time corresponding to the preamble field.

The determination unit 70 determines the value of the despread signal 204 in a time interval for the header field of the burst format of FIG. 1, in accordance with a predetermined threshold value for determination. The determination is made both for the in-phase component and the quadrature component of the despread signal 204.

The complex conjugate unit 72 calculates a complex conjugate of the signal subject to determination by the determination unit 70.

The switch unit 76 outputs a signal from the storage unit 74 in a time interval for the preamble and outputs a signal from the complex conjugate unit 72 in a time interval for the header field.

The multiplication unit 78 multiplies a reference signal output from the switch unit 76 with the despread signal 204 so as to output an error of the despread signal 204 with respect to the reference signal as the phase error signal 206. In the interval for the data field of the burst format of FIG. 1, the phase error signal 206, determined in the interval for the header field, continues to be output.

Figure 7:
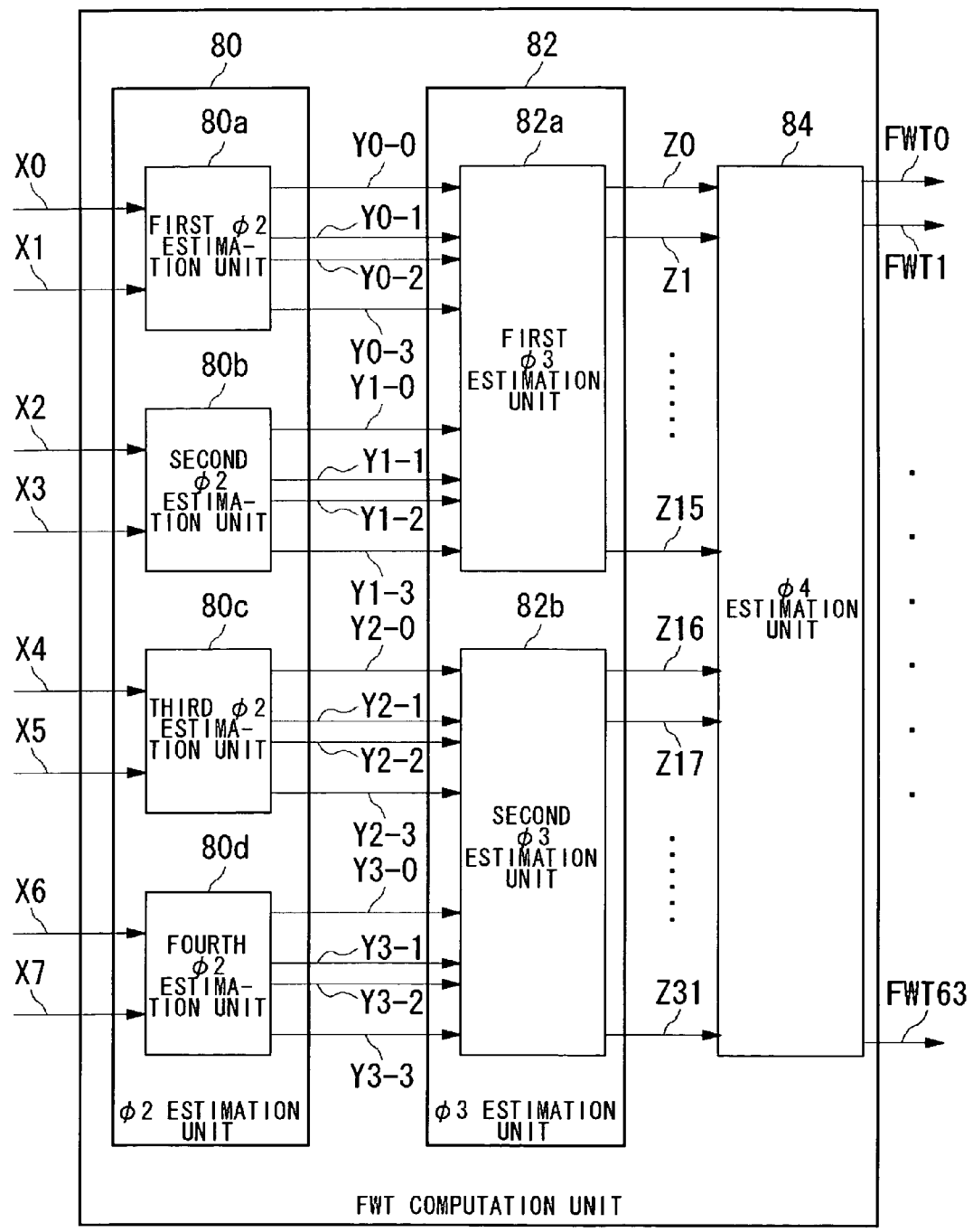
FIG. 7 illustrates the structure of an FWT computation unit of FIG. 3.

FIG. 7 shows the structure of the FWT computation unit 50. The FWT computation unit 50 includes a first φ2 estimation unit 80a, a second φ2 estimation unit 80b, a third φ2 estimation unit 80c and a fourth φ2 estimation unit 80d, generically referred to as a φ2 estimation unit 80, and a first φ3 estimation unit 82a and a second φ3 estimation unit 82b, generically referred to as a φ3 estimation unit 82, and a φ4 estimation unit 84. The signals involved include X0, X1, X2, X3, X4, X5, X6 and X7, generically referred to as a chip signal X, Y0-0, Y0-1, Y0-2, Y0-3, Y1-O, Y1-1, Y1-2, Y1-3, Y2-0, Y2-1, Y2-2, Y2-3, Y3-0, Y3-1, Y3-2, Y3-3, generically referred to as a first correlation Y, and Z0, Z1, Z15, Z16, Z17 and Z31, generically referred to as a second correlation Z, and FWT0, FWT1 and FWT63, generically referred to as a Walsh transform value FWT.

The units comprising the φ2 estimation unit 80 each receive two chip signals X. For example, a unit receives X0 and X1, rotate the phase of X0 by π/2, π and 3π/2, add X1 and X0 thus rotated so as to output Y0-1 through Y0-3, respectively. When the phase of X0 thus rotated equals the phase φ2, a first correlation Y resulting from the addition is corresponding large. This is how φ2 is estimated. Since the chip signal X corresponds to the signal converted by the decision unit 150, each of the in-phase component and the quadrature component thereof comprises 2 bits.

The φ3 estimation unit 82 operates similarly to the φ2 estimation unit 80. For example, the φ3 estimation unit 82 receives Y0-0 through Y0-3 and Y1-0 through Y1-3 so as to output Z0 through Z15. φ3 is estimated by referring to the magnitude of a second correlation Z. The φ4 estimation unit 84 operates similarly to the φ2 estimation unit 80. The φ4 estimation unit 84 receives Z0 through Z31 so as to output FWT0 through FWT 63. φ4 and φ1 prior to differential detection are estimated by referring to the magnitude of the Walsh transform values FWT.

Figure 8:
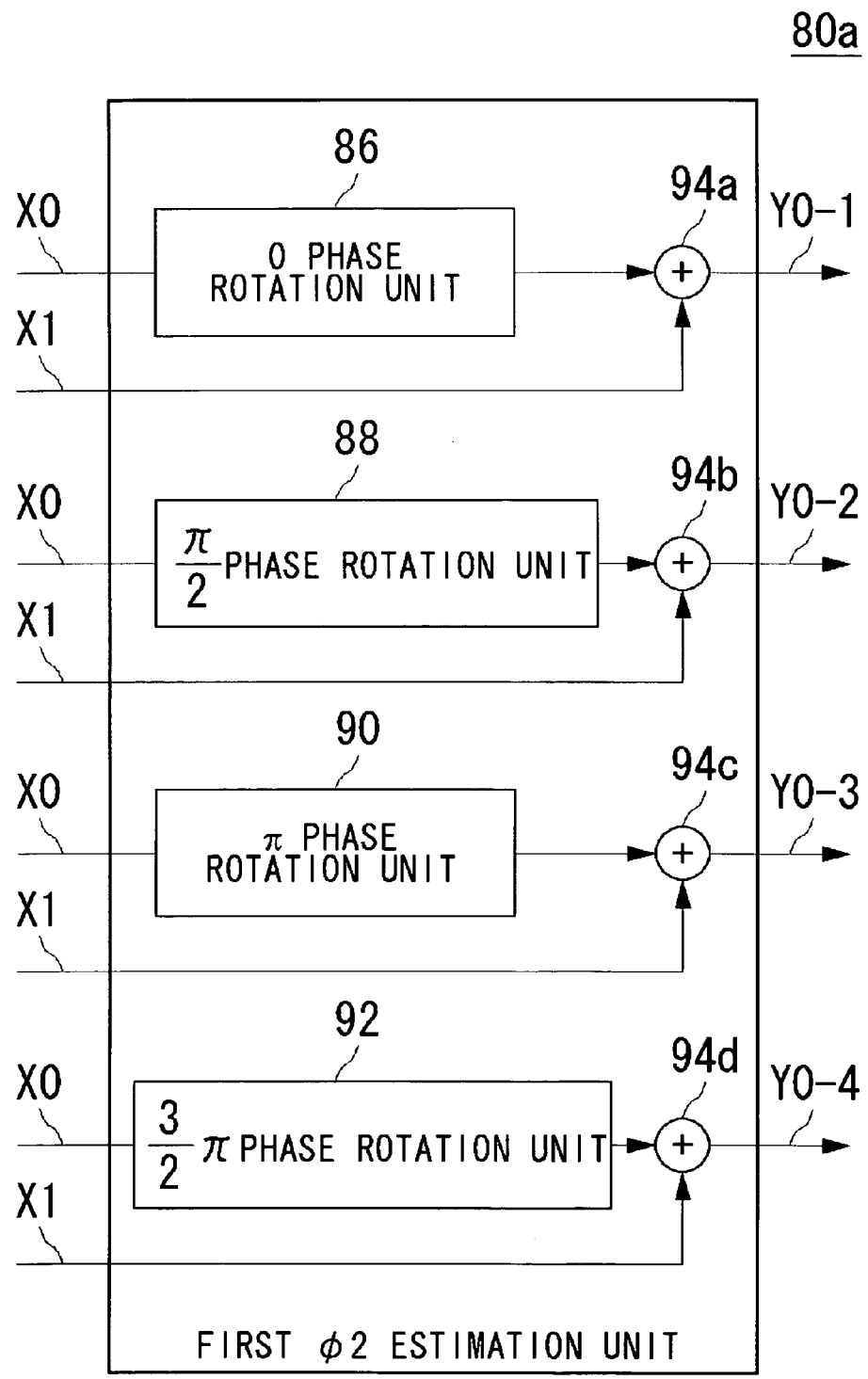
FIG. 8 illustrates the structure of a first $\phi 2$ estimation unit of FIG. 7.

FIG. 8 shows the structure of the first φ2 estimation unit 80a. The first φ2 estimation unit 80a includes a 0 phase rotation unit 86, a π/2 phase rotation unit 88, a π phase rotation unit 90, a 3/2π phase rotation unit 92, a first addition unit 94a, a second addition unit 94b, a third addition unit 94c and a fourth addition unit 94d, generically referred to as an addition unit 94.

The 0 phase rotation unit 86, the π/2 phase rotation unit 88, the π phase rotation unit 90, the 3/2π phase rotation unit 92 rotate the phase of X0 by 0, π/2, π, 3π/2, respectively. The outputs are added to X1 in the addition unit 94.

Figure 9:
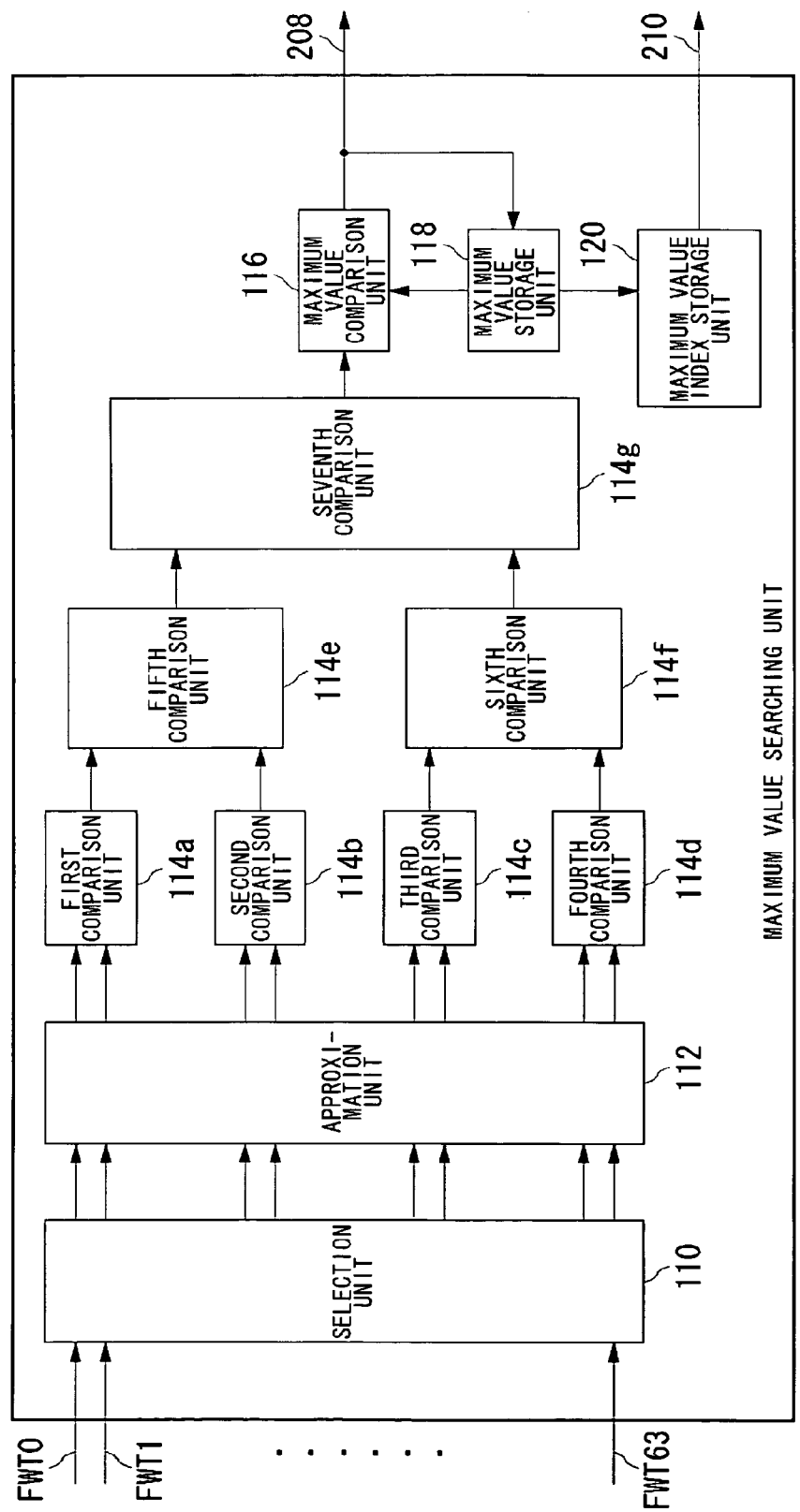
FIG. 9 illustrates the structure of a maximum value searching unit of FIG. 3.

FIG. 9 shows the structure of the maximum value searching unit 52. The maximum value searching unit 52 includes a selection unit 110, an approximation unit 112, a first comparison unit 114a, a second comparison unit 114b, a third comparison unit 114c, a fourth comparison unit 114d, a fifth comparison unit 114e a sixth comparison unit 114f, a seventh comparison unit 114g, generically referred to as a comparison unit 114, a maximum value comparison unit 116, a maximum value storage unit 118 and a maximum value Index storage unit 120.

The selection unit 110 receives 64 data items FWT0 through FWT63 and outputs the data in units of 8 items. For example, the selection unit 110 outputs FWT0 through FWT7 initially and subsequently outputs FWT8 through FWT15.

The approximation unit 112 determines the approximate value of the magnitude of Walsh transform value FWT such that the approximate value is larger as the value FWT approaches the phase to which the CCK modulated signal is assigned. Assuming that the in-phase component and the quadrature component of a Walsh transform FWT are denoted by I and Q, the magnitude R is given by a sum of absolute values.

$$R=|I|+|Q| \quad (3)$$

The comparison unit 114 compares R for eight data items with each other and selects the largest Walsh transform value FWT that survived the tournament.

The maximum value comparison unit 116 compares a selected one of FWT0 through FWT63 with the maximum value determined from a previous search in the 8 Walsh transform values FWT, so as to select the larger of the compared values. Finally, the maximum value comparison unit 116 selects the largest Walsh transform value FWT from FWT0 through FWT63. The selected Walsh transform value FWT is stored in the maximum value storage unit 118. The maximum value Index storage unit 120 outputs a combination of φ2 through φ4 corresponding to the maximum Walsh transform value FWT ultimately stored in the maximum value storage unit 118.

Figure 10:
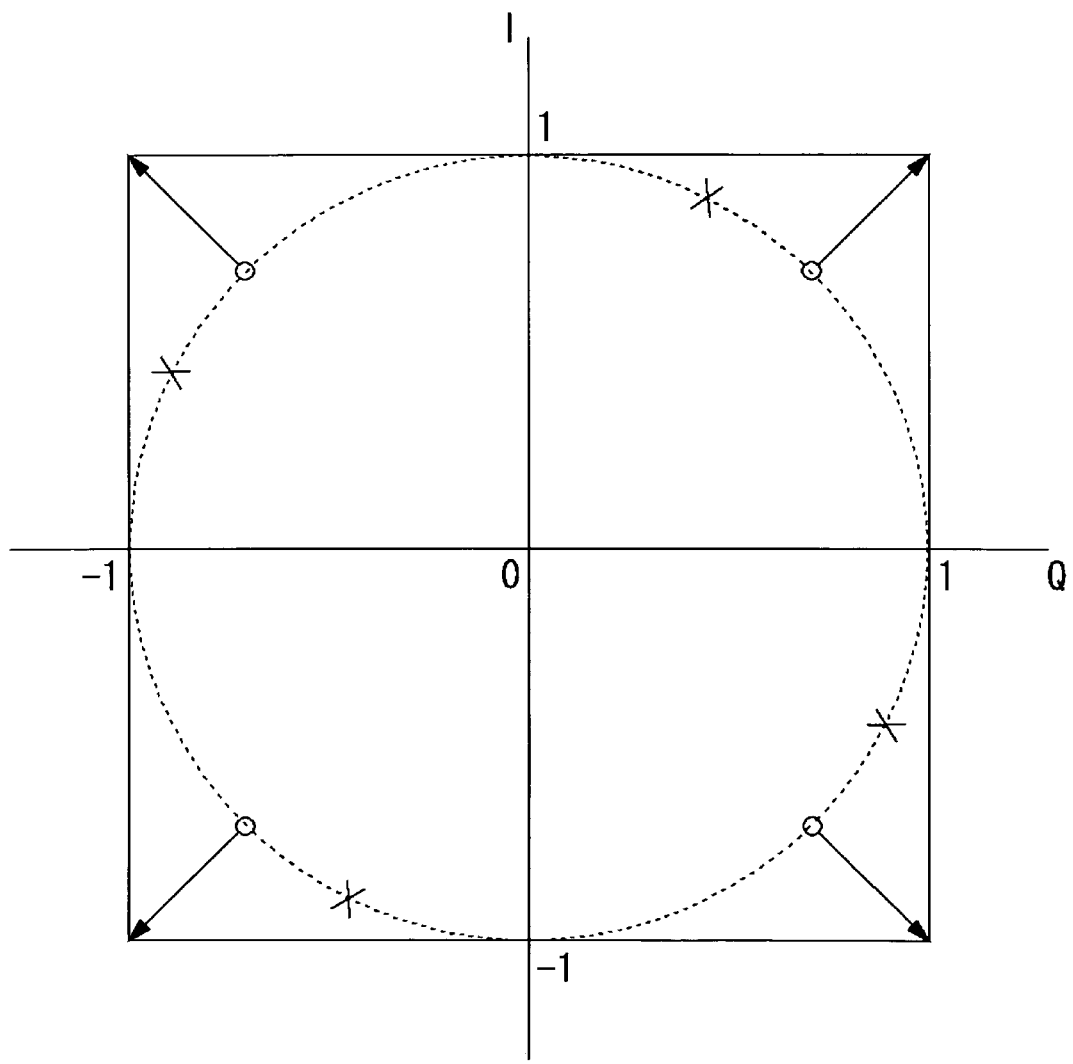
FIG. 10 illustrates the constellation of signals subjected to Walsh transform to be selected by the maximum searching unit of FIG. 3.

FIG. 10 shows a constellation of the Walsh transform values FWT to be selected by the maximum value searching unit 52. The I-axis and the Q-axis in the figure represent an in-phase axis and an quadrature axis, respectively. Encircled points indicated in the figure represent a constellation of ideal Walsh transform values FWT in a case where there is no phase error. A dotted line indicates a plot of equal magnitudes of Walsh transform values FWT determined as a normal square sum. The square in the figure indicates the equal magnitudes of the Walsh transform values FWT determined as an absolute sum and corresponding to the dotted line. The values "1" and "−1" shown on the I-axis and the Q-axis are normalized Walsh transform values FWT. Actual Walsh transform values FWT may be different. A displacement between the square and the dotted line indicates an error occurring as a result of approximation. The error is large at $\pi/4$, $3\pi/4$, $5\pi/4$ and $7\pi/4$. Since the approximate value is larger than the non-approximate value at phases at which the constellation points of the Walsh transform values FWT should be assigned, as illustrated, the likelihood of the Walsh transform values FWT assigned to those phases being selected is increased so that the receiving performance is improved. When a phase error occurs, the constellation points of the Walsh transform values FWT are indicated by x in the figure. Therefore, the likelihood of those Walsh transform values FWT being selected is decreased so that there is a possibility that the receiving performance is degraded. In order to prevent this from taking place, the first phase rotation unit 130 and the second phase rotation unit 132 according to the example effects phase rotation.

A description will now be given of the operation of the receiver 10 according to the example. In time intervals for the preamble and header fields, the correlator 44 despreads the signal equalized by the equalizer unit 42. The demodulation unit 46 demodulates the resultant signal so as to output the output signal 202. The first phase error detection unit 48 detects the phase error signal 206 from the demodulated signal 204. The first phase rotation unit 130 corrects the phase of the digital received signal 200 in accordance with the phase error signal 206. In a time interval for data, the second phase rotation unit 132 corrects the phase of the signal equalized by the equalizer unit 42 in accordance with the phase error detected by the second phase error detection unit 56. The decision unit 150 defines a plurality of sub-areas, identifies one of the plurality of sub-areas corresponding to the signal corrected by the second phase rotation unit 132 and outputs a value corresponding to the identified sub-area. The FWT computation unit 50 determines Walsh transform values FWT by subject the value corresponding to the identified sub-area. The maximum value searching unit 52 determines the magnitude of the Walsh transform values FWT as a sum of absolute values, so as to output a combination of φ2 through φ4 corresponding to the maximum Walsh transform value FWT. The φ1 demodulation unit 54 outputs φ1.

According to the example of the present invention, a pre-FWT signal is converted into a signal of a smaller number of bits before being subject to FWT computation. Therefore, the processing volume required in FWT computation and the subsequent steps is reduced. It is ensured that the pre-FWT signal is converted into a signal of a smaller number of bits after correcting the absolute phase of the received signal. Further, the converted signal is defined such that the greater the reliability of the converted signal, the larger the absolute value thereof. Therefore, degradation in the receiving performance due to reduction in processing volume is minimized. When the magnitude of the signal subject to FWT computation is small, the signal is converted into a value not related to the phase of the signal. Therefore, adverse effects from the small signal are prevented.

Described above is an explanation based on the embodiment. The embodiment is only illustrative in nature and it will be obvious to those skilled in the art that variations in constituting elements and processes are possible within the scope of the present invention.

In the example of the present invention, the approximation unit 112 determines an approximate value R of the magnitude of the Walsh transform value FWT as a sum of absolute values. Alternatively, the approximate value R of the magnitude of the Walsh transform FWT may be determined as given below.

$$R = \text{Max}\{|I|, |Q|\} + 0.5 \times \text{Min}\{|I|, |Q|\} \tag{4}$$

Alternatively, the approximate value R may be determined as follows.

$$R = \text{Max}\{|I|, |Q|\} + k \times \text{Min}\{|I|, |Q|\} \tag{5}$$

where k indicates a constant.

Alternatively, the an error between the phase of the Walsh transform value FWT and one of the phases to which the Walsh codes are assigned may be calculated. A coefficient may be calculated such that, as the error becomes smaller, the magnitude of the coefficient is larger accordingly. Subsequently, the coefficient is multiplied by a square sum of I and Q of the Walsh transform values FWT, so as to determine the approximate value R. According to a variation described above, the receiving performance is improved. The point here is that, the closer the phase of the Walsh transform value FWT to the phase to which the Walsh code is assigned, the larger the magnitude of the approximate value R.

According to the example of the present invention, the receiving apparatus 10 corrects a phase error on an assumption that a frequency offset in the received signal is relatively small. In an alternative approach, frequency offset as well as phase error may be corrected. For example, the first phase error detection unit 48 may detect frequency offset as well as the phase error signal 206 in the interval for preamble and header in the burst format. Further, the first phase rotation unit 130 may rotate the digital received signal 200 by the detected frequency offset. According to a variation described above, the range for detection of phase error can be narrowed since a frequency offset is corrected. The precision in detection is increased accordingly. Therefore, the receiving performance is increased. That is, the requirement in this case is that the phase error of the received signal is corrected.

Although the present invention has been described by way of exemplary embodiments and modifications, it should be understood that many other changes and substitutions may further be made by those skilled in the art without departing from the scope of the present invention which is defined by the appended claims.

What is claimed is:

1. A receiver comprising:
   a receiving unit which receives a signal in which a symbol comprises Walsh codes each comprising a plurality of chips and each generated from a plurality of phase signals;
   a phase correction unit which corrects a phase of the received signal such that the phase approaches one of phases to which Walsh codes are assigned;

a signal transform unit which partitions a phase plane in which a phase-corrected signal is assigned into a plurality of sub-areas in accordance with the phases to which the Walsh codes are assigned, identifies one of the sub-areas that corresponds to the phase-corrected signal, and thereby transforms the phase-corrected signal into a value corresponding to the identified sub-area;

a Walsh transform unit which subjects the value corresponding to the identified sub-area to Walsh transform symbol by symbol, so as to generate a plurality of correlations; and a selection unit which selects one correlation from the plurality of correlations thus generated and outputs a plurality of phase signals corresponding to the selected correlation, wherein the signal transform unit defines the number of bits in the value corresponding to the identified sub-area to be smaller than the number of bits in the phase-corrected signal.

2. The receiver according to claim 1, wherein the signal transform unit defines the number of sub-areas to be equal to or larger than the number of phases to which the Walsh codes are assigned, and defines an absolute value of the value corresponding to the identified sub-area that includes a phase to which a corresponding one of the Walsh codes is assigned to be relatively large.

3. The receiver according to claim 1, wherein the signal transform unit provides the sub-area to which the phase-corrected signal should belong when a magnitude of the phase-corrected signal is smaller than a predetermined threshold value, and defines an absolute value of the value corresponding to the sub-area thus provided is relatively small.

4. The receiver according to claim 2, wherein the signal transform unit provides the sub-area to which the phase-corrected signal should belong when a magnitude of the phase-corrected signal is smaller than a predetermined threshold value, and defines the absolute value of the value corresponding to the sub-area thus provided is relatively small.

5. The receiver apparatus according to claim 1, wherein the Walsh code included in the signal received by the receiving unit is assigned to a phase at which absolute values of an in-phase component of the Walsh code and a quadrature component of the Walsh code are identical, and the signal transform unit defines the value corresponding to the identified sub-area to comprise the same number of bits in an in-phase component and a quadrature component.

6. The receiver apparatus according to claim 2, wherein the Walsh code included in the signal received by the receiving unit is assigned to a phase at which the absolute values of an in-phase component of the Walsh code and a quadrature component of the Walsh code are identical, and the signal transform unit defines the value corresponding to the identified sub-area to comprise the same number of bits in an in-phase component and a quadrature component.

7. The receiver apparatus according to claim 3, wherein the Walsh code included in the signal received by the receiving unit is assigned to a phase at which the absolute values of an in-phase component of the Walsh code and a quadrature component of the Walsh code are identical, and the signal transform unit defines the value corresponding to the identified sub-area to comprise the same number of bits in an in-phase component and a quadrature component.

8. The receiver apparatus according to claim 4, wherein the Walsh code included in the signal received by the receiving unit is assigned to a phase at which the absolute values of an in-phase component of the Walsh code and a quadrature component of the Walsh code are identical, and the signal transform unit defines the value corresponding to the identified sub-area to comprise the same number of bits in an in-phase component and a quadrature component.

9. The receiver according to claim 1, wherein the selection unit comprises:
an approximation unit which calculates an approximate value of a magnitude of the plurality of correlations such that the approximate value is larger as the correlation approaches any of the phases to which the Walsh codes are assigned; and
an output unit which selects one of the correlation by referring to the approximate value of the magnitude of the plurality of correlations thus calculated, and outputs the plurality of phase signals corresponding to the selected correlation.

10. The receiver according to claim 2, wherein the selection unit comprises:
an approximation unit which calculates an approximate value of a magnitude of the plurality of correlations such that the approximate value is larger as the correlation approaches any of the phases to which the Walsh codes are assigned; and
an output unit which selects one of the correlation by referring to the approximate value of the magnitude of the plurality of correlations thus calculated, and outputs the plurality of phase signals corresponding to the selected correlation.

11. The receiver according to claim 3, wherein the selection unit comprises:
an approximation unit which calculates an approximate value of a magnitude of the plurality of correlations such that the approximate value is larger as the correlation approaches any of the phases to which the Walsh codes are assigned; and
an output unit which selects one of the correlation by referring to the approximate value of the magnitude of the plurality of correlations thus calculated, and outputs the plurality of phase signals corresponding to the selected correlation.

12. The receiver according to claim 4, wherein the selection unit comprises:
an approximation unit which calculates an approximate value of a magnitude of the plurality of correlations such that the approximate value is larger as the correlation approaches any of the phases to which the Walsh codes are assigned; and an output unit which selects one of the correlation by referring to the approximate value of the magnitude of the plurality of correlations thus calculated, and outputs the plurality of phase signals corresponding to the selected correlation.

13. The receiver according to claim 5, wherein the selection unit comprises:
an approximation unit which calculates an approximate value of a magnitude of the plurality of correlations such that the approximate value is larger as the correlation approaches any of the phases to which the Walsh codes are assigned; and
an output unit which selects one of the correlation by referring to the approximate value of the magnitude of the plurality of correlations thus calculated, and outputs the plurality of phase signals corresponding to the selected correlation.

14. The receiver according to claim 6, wherein the selection unit comprises:

an approximation unit which calculates an approximate value of a magnitude of the plurality of correlations such that the approximate value is larger as the correlation approaches any of the phases to which the Walsh codes are assigned; and an output unit which selects one of the correlation by referring to the approximate value of the magnitude of the plurality of correlations thus calculated, and outputs the plurality of phase signals corresponding to the selected correlation.

15. The receiver according to claim 7, wherein the selection unit comprises:

an approximation unit which calculates an approximate value of a magnitude of the plurality of correlations such that the approximate value is larger as the correlation approaches any of the phases to which the Walsh codes are assigned; and an output unit which selects one of the correlation by referring to the approximate value of the magnitude of the plurality of correlations thus calculated, and outputs the plurality of phase signals corresponding to the selected correlation.

16. The receiver according to claim 8, wherein the selection unit comprises:

an approximation unit which calculates an approximate value of a magnitude of the plurality of correlations such that the approximate value is larger as the correlation approaches any of the phases to which the Walsh codes are assigned; and an output unit which selects one of the correlation by referring to the approximate value of the magnitude of the plurality of correlations thus calculated, and outputs the plurality of phase signals corresponding to the selected correlation.

17. A receiving method comprising the steps of:

receiving a signal in which a symbol comprises Walsh codes each comprising a plurality of chips and each generated from a plurality of phase signals;

correcting a phase of the received signal such that the phase approaches one of phases to which Walsh codes are assigned;

partitioning a phase plane in which a phase-corrected signal is assigned into a plurality of sub-areas in accordance with the phases to which the Walsh codes are assigned, identifying one of the sub-areas that corresponds to the phase-corrected signal, and thereby transforming the phase-corrected signal into a value corresponding to the identified sub-area;

subjecting the value corresponding to the identified sub-area to Walsh transform symbol by symbol, so as to generate a plurality of correlations; and selecting one correlation from the plurality of correlations thus generated and outputting a plurality of phase signals corresponding to the selected correlation, wherein the step of transforming defines the number of bits corresponding to the identified sub-area to be smaller than the number of bits in the phase-corrected signal.

18. The receiving method according to claim 17, wherein the transforming step defines the number of sub-areas to be equal to or larger than the number of phases to which the Walsh codes are assigned, and defines an absolute value of the value corresponding to the identified sub-area that includes a phase to which a corresponding one of the Walsh codes is assigned to be relatively large.

19. The receiving method according to claim 17, wherein the transforming step provides a sub-area to which the phase-corrected signal should belong when a magnitude of the phase-corrected signal is smaller than a predetermined threshold value, and defines an absolute value of the value corresponding to the sub-area thus provided is relatively small.

20. The receiving method according to claim 17, wherein the Walsh code included in the signal received by the receiving step is assigned to a phase at which absolute values of an in-phase component of the Walsh code and a quadrature component of the Walsh code are identical, and the transforming step defines the value corresponding to the identified sub-area to comprise the same number of bits in an in-phase component and a quadrature component.

21. The receiving method according to claim 17, wherein the selecting step comprises the steps of:

calculating an approximate value of a magnitude of the plurality of correlations such that the approximate value is larger as the correlation approaches any of the phases to which the Walsh codes are assigned; and selecting one of the correlation by referring to the approximate value of the magnitude of the plurality of correlations thus calculated, and outputting the plurality of phase signals corresponding to the selected correlation.

* * * * *